US012108232B2

(12) United States Patent
Li et al.

(10) Patent No.: US 12,108,232 B2
(45) Date of Patent: Oct. 1, 2024

(54) SOUND GENERATING DEVICE

(71) Applicant: GOERTEK INC., Shandong (CN)

(72) Inventors: Jie Li, Shandong (CN); Huawei Liu, Shandong (CN); Guodong Zhao, Shandong (CN)

(73) Assignee: GOERTEK INC., Weifang (CN)

( * ) Notice: Subject to any disclaimer, the term of this patent is extended or adjusted under 35 U.S.C. 154(b) by 131 days.

(21) Appl. No.: 17/995,129

(22) PCT Filed: Dec. 5, 2020

(86) PCT No.: PCT/CN2020/134127
§ 371 (c)(1),
(2) Date: Sep. 30, 2022

(87) PCT Pub. No.: WO2021/208458
PCT Pub. Date: Oct. 21, 2021

(65) Prior Publication Data

US 2023/0171547 A1 Jun. 1, 2023

(30) Foreign Application Priority Data

Apr. 16, 2020 (CN) ......................... 202010303878.8

(51) Int. Cl.
*H04R 9/02* (2006.01)
*H04R 9/04* (2006.01)
*H04R 9/06* (2006.01)

(52) U.S. Cl.
CPC ............. *H04R 9/025* (2013.01); *H04R 9/046* (2013.01); *H04R 9/06* (2013.01)

(58) Field of Classification Search
CPC ........... H04R 9/025; H04R 9/046; H04R 9/06
See application file for complete search history.

(56) References Cited

U.S. PATENT DOCUMENTS

2016/0021441 A1 1/2016 Shao

FOREIGN PATENT DOCUMENTS

CN 107396267 A 11/2017
CN 207124755 U 3/2018
CN 207184805 U 4/2018
(Continued)

OTHER PUBLICATIONS

International Search Report from International Application No. PCT/CN2020/134127 mailed Feb. 26, 2021.

*Primary Examiner* — Sunita Joshi
(74) *Attorney, Agent, or Firm* — Shih IP Law Group, PLLC

(57) ABSTRACT

The present invention discloses a sound generating device, which comprises a housing, and a vibration system and a magnetic circuit system which are coupled to the housing, wherein the magnetic circuit system comprises a magnetic conductive yoke, the magnetic conductive yoke comprises a magnetic conductive body and a connecting flange, the magnetic conductive body faces a diaphragm of the vibration system, the connecting flange is formed by bending the magnetic conductive body towards a side where the diaphragm is located, and the connecting flange is provided with a plurality of ventilation holes; and wherein a leakage opening is formed between the housing and the magnetic conductive body, and the connecting flange completely covers the leakage opening. The technical solutions of the present invention can reduce the defective rate of products.

12 Claims, 5 Drawing Sheets

(56) References Cited

FOREIGN PATENT DOCUMENTS

| | | | | | |
|---|---|---|---|---|---|
| CN | 108322871 | A | | 7/2018 | |
| CN | 108650603 | A | | 10/2018 | |
| CN | 209731559 | U | * | 12/2019 | ............... H04R 9/02 |
| CN | 210093516 | U | | 2/2020 | |
| CN | 111510830 | A | | 8/2020 | |
| CN | 211720736 | U | | 10/2020 | |
| KR | 20020043839 | A | | 6/2002 | |

* cited by examiner

SOUND GENERATING DEVICE

TECHNICAL FIELD

The present invention relates to the technical field of acoustic energy transducer, particularly, to a sound generating device.

BACKGROUND ART

In the sound generating devices of related technologies, in order to realize the full filling technology of the rear acoustic cavity, a mesh cloth is generally disposed on the leakage opening of the sound generating device, and the mesh cloth and the housing of the sound generating device are integrally molded by injection molding, or fixed by bonding.

However, since it is difficult to maintain the shape of the mesh cloth, a misalignment between the mesh cloth and the leakage opening during integral injection molding or bonding may occur, so that the defective rate of products is increased.

SUMMARY

The main object of the present invention is to provide a sound generating device, and is intended to reduce the defective rate of products.

In order to achieve the above object, the sound generating device provided by the present invention comprises a housing, and a vibration system and a magnetic circuit system which are coupled to the housing, wherein the magnetic circuit system comprises a magnetic conductive yoke, the magnetic conductive yoke includes a magnetic conductive body and a connecting flange, the magnetic conductive body faces a diaphragm of the vibration system, the connecting flange is formed by bending the magnetic conductive body towards a side where the diaphragm is located, and the connecting flange is provided with a plurality of ventilation holes; and wherein a leakage opening is formed between the housing and the magnetic conductive body, and the connecting flange completely covers the leakage opening.

Optionally, the housing is formed with a plurality of first stop walls, the first stop walls extend towards the magnetic conductive body and abut on the magnetic conductive body, and the leakage opening is formed by an interval between two adjacent first stop walls.

Optionally, the connecting flange is clamped by two adjacent first stop walls.

Optionally, a locating flange is further formed by bending the magnetic conductive body towards the diaphragm to form, and the housing is formed with a locating notch into which the locating flange is inserted.

Optionally, the housing is further formed with a plurality of second stop walls, and the second stop walls extend towards the magnetic conductive body and abut on the magnetic conductive body, wherein the locating notch is formed between the first stop wall and the second stop wall adjacent to each other.

Optionally, a surface of the connecting flange away from the magnetic conductive body abuts on the housing.

Optionally, a surface of the housing facing the magnetic conductive body is provided with a slot, and the connecting flange is inserted into the slot.

Optionally, the slot further penetrates through an outer side surface of the housing.

Optionally, the magnetic circuit system further comprises a first edge magnet, which is correspondingly provided at a side where the connecting flange is located, and a first ventilation gap is formed between the first edge magnet and the connecting flange; and/or the magnetic circuit system further comprises a first edge magnetic conductive plate, which is correspondingly provided at the side where the connecting flange is located, and a second ventilation gap is formed between the first edge magnetic conductive plate and the connecting flange.

Optionally, a length of the first edge magnet is less than that of the connecting flange, and a length of the first edge magnetic conductive plate is less than that of the connecting flange.

Optionally, a thickness of the connecting flange is less than or equal to 0.2 mm.

Optionally, the sound generating device has a rectangular shape, each of two short sides of the sound generating device is provided with one leakage opening, and each leakage opening is provided with one connecting flange correspondingly.

In the technical solutions of the present invention, by forming micropores in the magnetic conductive yoke, and bending the portion formed with the micropores to form a connecting flange to replace the bonded or injection molded mesh cloth, to implement a full filling sound generating device, the space can be saved, and there is no need to adopt a mold for injection molding, and thus the production cost is reduced. Meanwhile, there is no relative movement between the connecting flange and the magnetic conductive body, so that as long as the alignment between the magnetic conductive yoke and the housing is accurate, it can be ensured that the connecting flange accurately covers the leakage opening. In addition, since the material of the connecting flange is the material of the magnetic conductive yoke, and the magnetic conductive yoke substantially has great strength and hardness, it can be ensured that the connecting flange has a stable shape even if the thickness of the connecting flange is thin, so that the connection stability between the connecting flange and the housing can be ensured, the misalignment between the connecting flange and the leakage opening is prevented, thereby improving the yield of products. In addition, the connecting flange is used as a portion of the magnetic conductive yoke, and the connecting flange has the magnetic conductive effect itself, so that the space can be saved, the width of the magnet at the short side is increased, and the acoustic performance is improved.

BRIEF DESCRIPTION OF THE DRAWINGS

In order to more clearly illustrate the embodiments of the present invention or the technical solutions in the prior art, the attached drawings that need to be used in the embodiments of the present invention or the descriptions of the prior art will be briefly described below. It is obvious that the attached drawings in the following description are only some embodiments of the present invention. For those skilled in the art, other drawings can be obtained according to the structures shown in these attached drawings without creative labor.

DESCRIPTION OF REFERENCE NUMERALS

Figure 1:
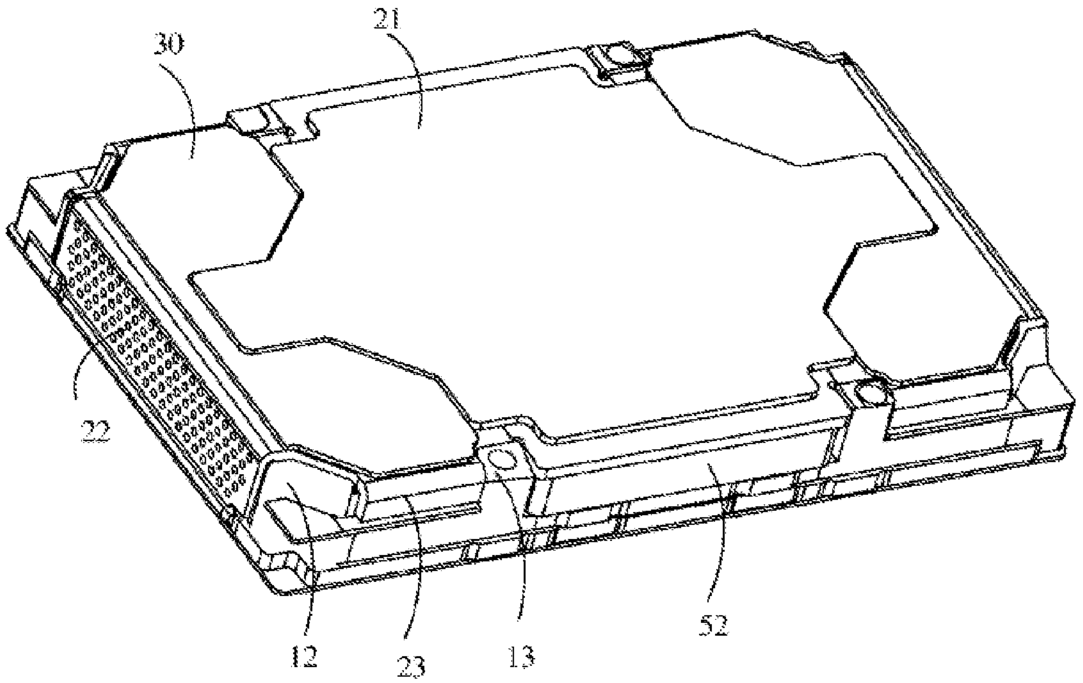
FIG. 1 is a schematic diagram of the structure of the sound generating device according to one embodiment of the present invention.

| Reference Numeral | Name | Reference Numeral | Name |
|---|---|---|---|
| 10 | housing | 23 | locating flange |
| 12 | first stop wall | 30 | cover plate |
| 13 | second stop wall | 41 | central magnet |
| 14 | slot | 42 | central magnetic conductive plate |
| 15 | ring body | | |
| 16 | mounting wall | 51 | first edge magnet |
| 20 | magnetic conductive yoke | 52 | second edge magnet |
| | | 61 | first edge magnetic conductive plate |
| 21 | magnetic conductive body | | |
| | | 62 | second edge magnetic conductive plate |
| 211 | first plate body | | |
| 212 | second plate body | 70 | diaphragm |
| 22 | connecting flange | 80 | voice coil |
| 221 | ventilation hole | 91 | first ventilation gap |
| | | 92 | second ventilation gap |

The realization of the object, functional features and advantages of the present invention will be further described with reference to the attached drawings in combination with the embodiments.

DETAILED DESCRIPTION OF EMBODIMENTS

The technical solutions in the embodiments of the present invention will be clearly and completely described below in combination with the attached drawings in the embodiments of the present invention. Obviously, the described embodiments are only a part of the embodiments of the present invention, not all of them. Based on the embodiments in the present invention, all other embodiments obtained by those skilled in the art without creative labor belong to the protection scope of the present invention.

It should be noted that directional indications (for example, on, below, left, right, front, and rear . . . ) in the embodiments of the present invention are only used to illustrate the relative position relationship and motion between various parts under a specific attitude (as shown in the drawings), and the directional indications will change accordingly when the specific attitude is changed.

In addition, the description such as “first”, “second” and the like in the embodiments of the present invention is only for descriptive objects, and cannot be understood as indicating or implying the relative importance of the indicated technical feature or implicitly indicating the number of the indicated technical feature. Therefore, the feature defined with “first” or “second” may explicitly or implicitly comprise at least one such feature. In addition, the technical solutions between various embodiments can be combined with each other, but it must be based on the condition that those skilled in the art can realize the combination. When a combination of technical solutions is contradictory or impossible to realize, it should be considered that this combination of the technical solutions does not exist and is not within the protection scope of the present invention.

The present invention provides a sound generating device, which may be used in devices such as earphones, mobile phones, notebook computers, VR devices, AR devices, televisions, etc.

Referring to FIGS. 1 to 6, the sound generating device comprises a housing 10, a vibration system, a magnetic circuit system and so on.

Here, the magnetic circuit system comprises a magnetic conductive yoke 20, an inner magnetic circuit part and an outer magnetic circuit part. Both of the inner magnetic circuit part and the outer magnetic circuit part are provided on the magnetic conductive yoke 20. The outer magnetic circuit part surrounds and is spaced apart from the inner magnetic circuit part, and the gap between the inner magnetic circuit part and the outer magnetic circuit part forms a magnetic gap.

Figure 2:
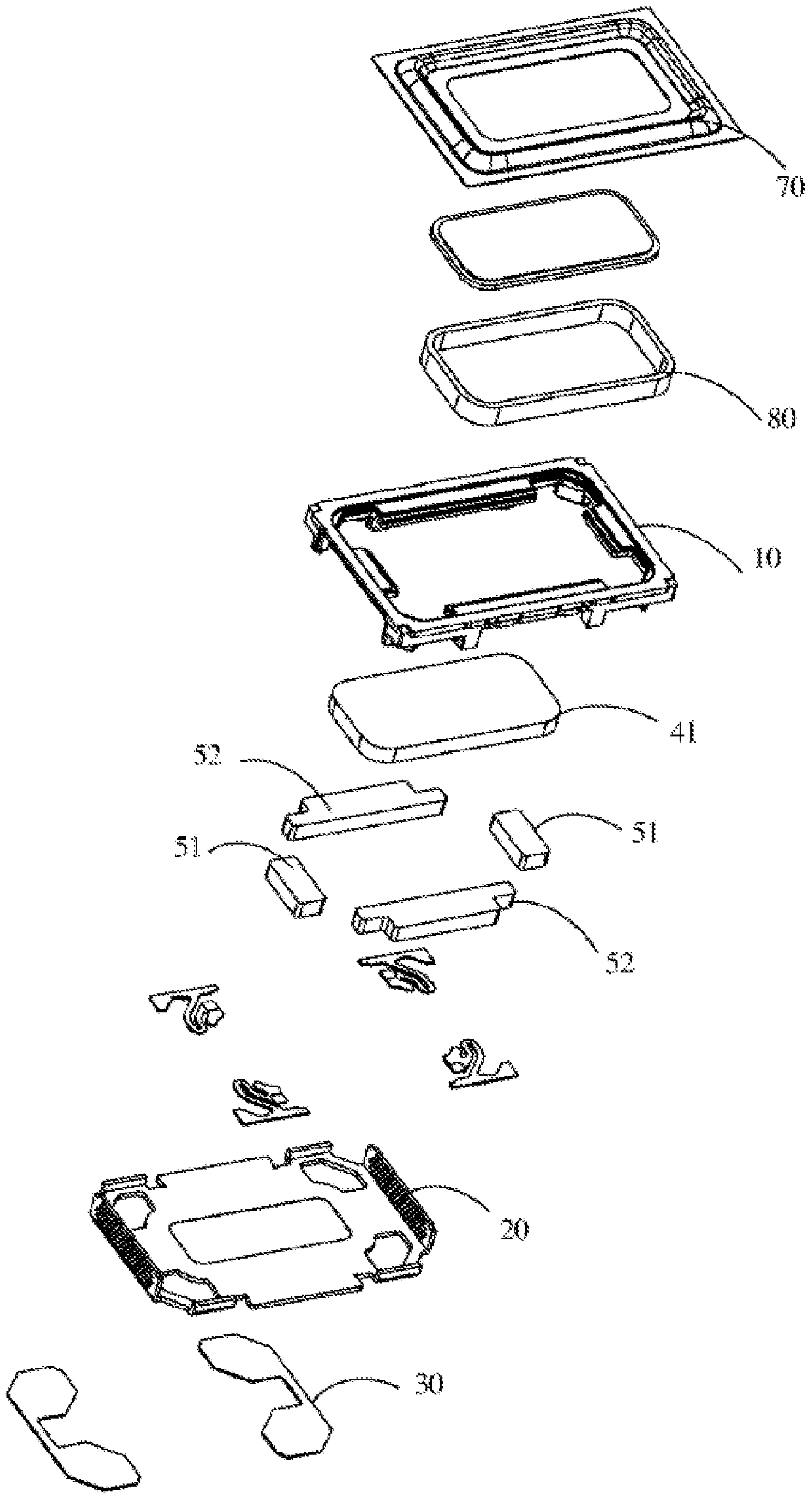
FIG. 2 is a schematic exploded perspective view of the sound generating device in FIG. 1.
Figure 3:
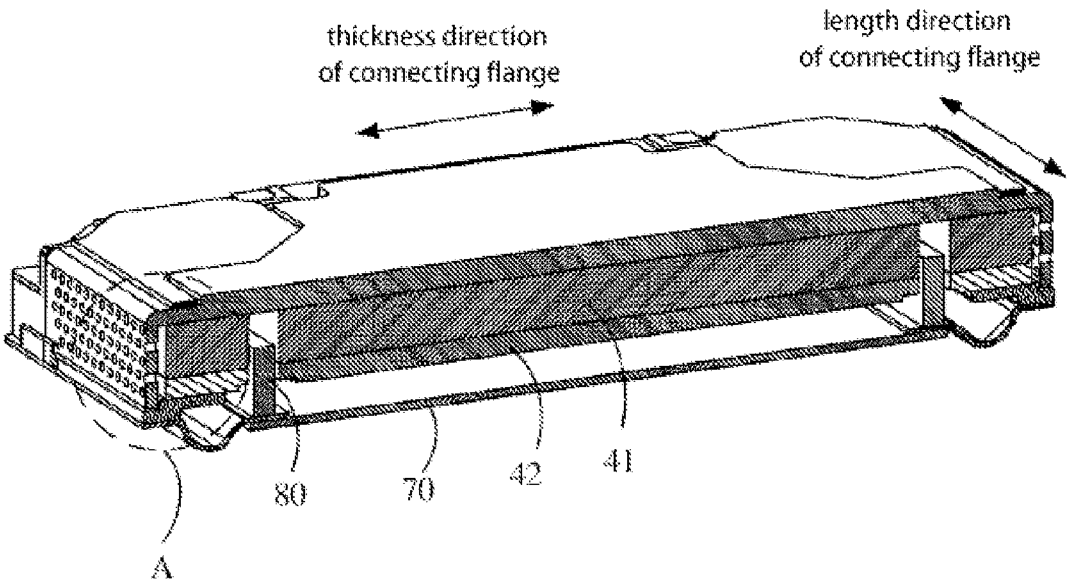
FIG. 3 is a schematic cross-section view of the sound generating device in FIG. 1.

Referring to FIGS. 2 and 3, for example, the inner magnetic circuit part comprises a central magnet 41 and a central magnetic conductive plate 42 disposed on the central magnet 41. The outer magnetic circuit part comprises an edge magnet and an edge magnetic conductive plate. The central magnet 41 and the edge magnet are provided on the magnetic conductive yoke 20, the central magnetic conductive plate 42 and the central magnet 41 are disposed to be stacked, and the edge magnetic conductive plate and the edge magnet are disposed to be stacked.

The vibration system comprises a diaphragm 70 and a voice coil 80. One end of the voice coil 80 is fixed to the diaphragm 70, and the other end of the voice coil 80 extends into the magnetic gap. The diaphragm 70 comprises a center portion and an edge portion surrounding the center portion. In addition, the diaphragm 70 may further comprise a suspension ring portion located between the center portion and the edge portion. In other examples, the diaphragm 70 has a planar structure. A reinforcing layer is further provided at the center portion of the diaphragm 70. The reinforcing layer can effectively reduce the split vibration of the diaphragm 70 and reduce the noise of the sound generating device.

Figure 5:
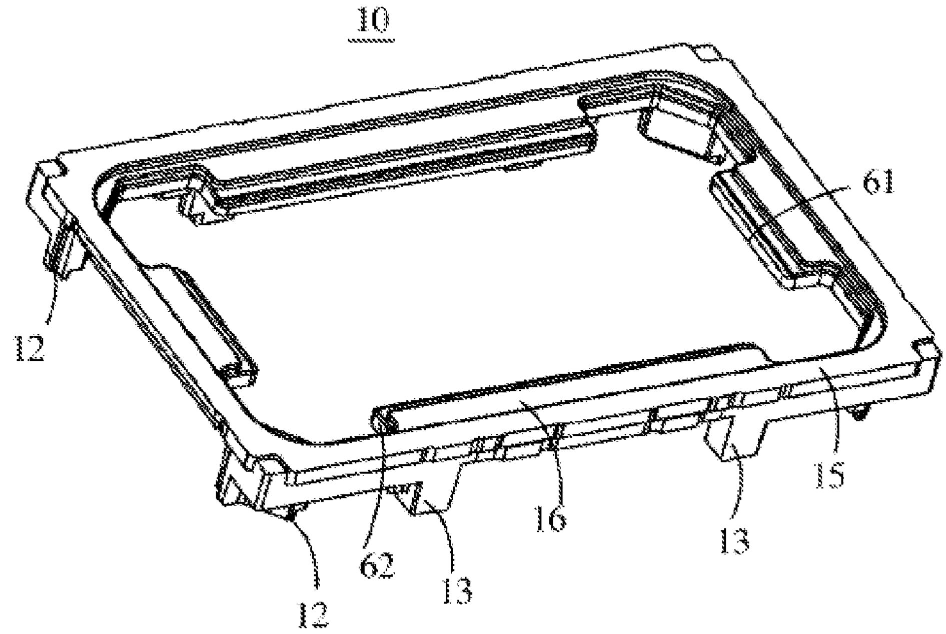
FIG. 5 is a schematic diagram of the structure of the housing in FIG. 2.

Referring to FIG. 5, the housing 10 may extend along the outer edge of the magnetic conductive yoke 20 to have a ring shape, and is connected to the magnetic circuit system and the vibration system respectively. For example, the edge portion of the diaphragm 70 is substantially coupled to the housing 10, i.e., the housing 10 surrounds the edge portion of the diaphragm 70. In addition, the housing 10 is also connected to the magnetic conductive yoke 20 or the edge magnet, and the housing 10 and the magnetic conductive yoke 20 form a structure with an opening facing the diaphragm 70 together. It should be noted that the annular housing 10 refers to a fully closed ring or a partially closed ring.

The sound generating device may have a rectangular shape, a circular shape, an oval shape, etc. Hereinafter, take a sound having a rectangular shape as an example to illustrate the present disclosure. The sound generating device comprises two long sides and two short sides. The length of the long side is greater than that of the short side. Long sides and short sides of the voice coil 80, the diaphragm 70, the housing 10 and the magnetic circuit system correspond to the long and short sides of the sound generating device, respectively.

Figure 4:
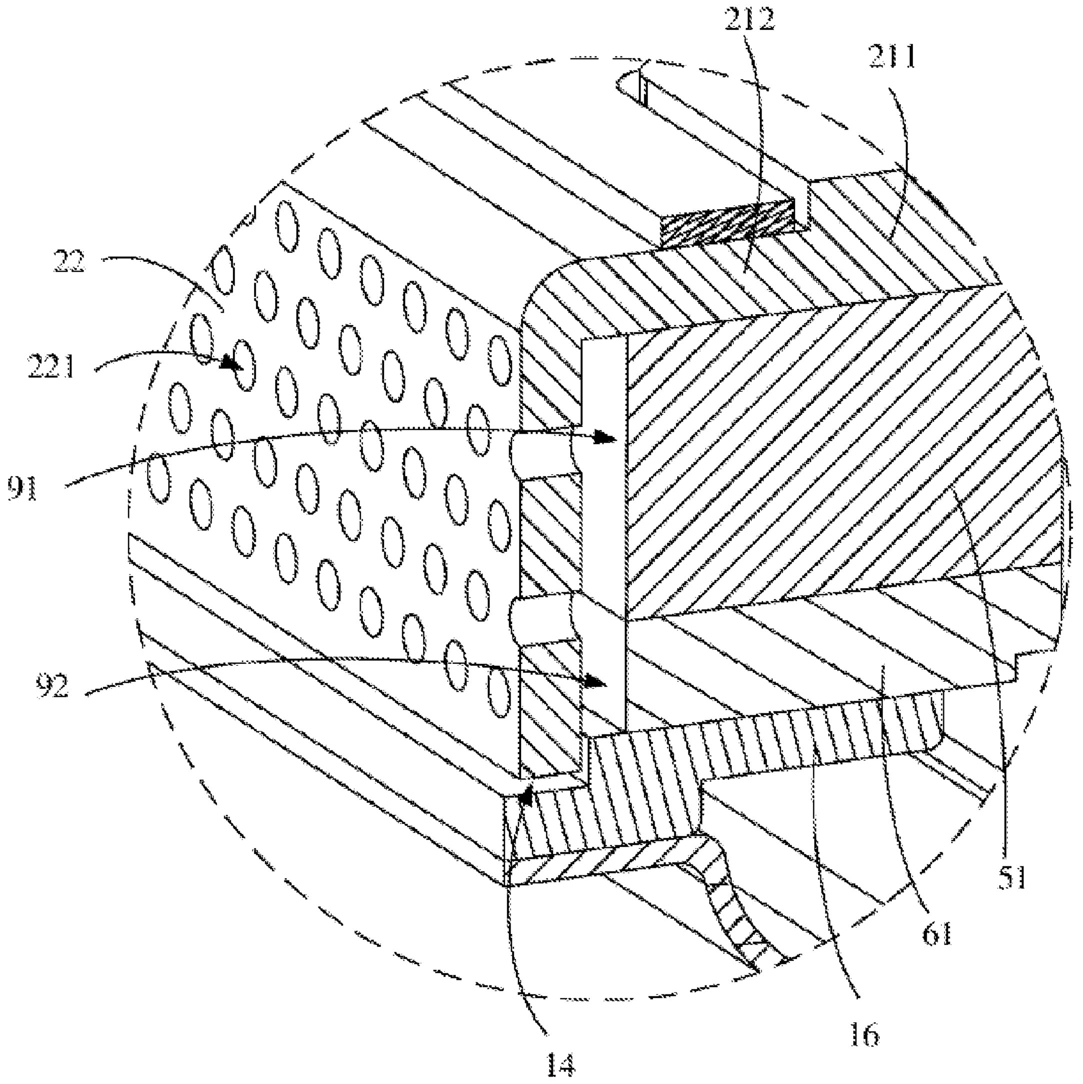
FIG. 4 is a schematic enlarged diagram of portion A in FIG. 3.
Figure 6:
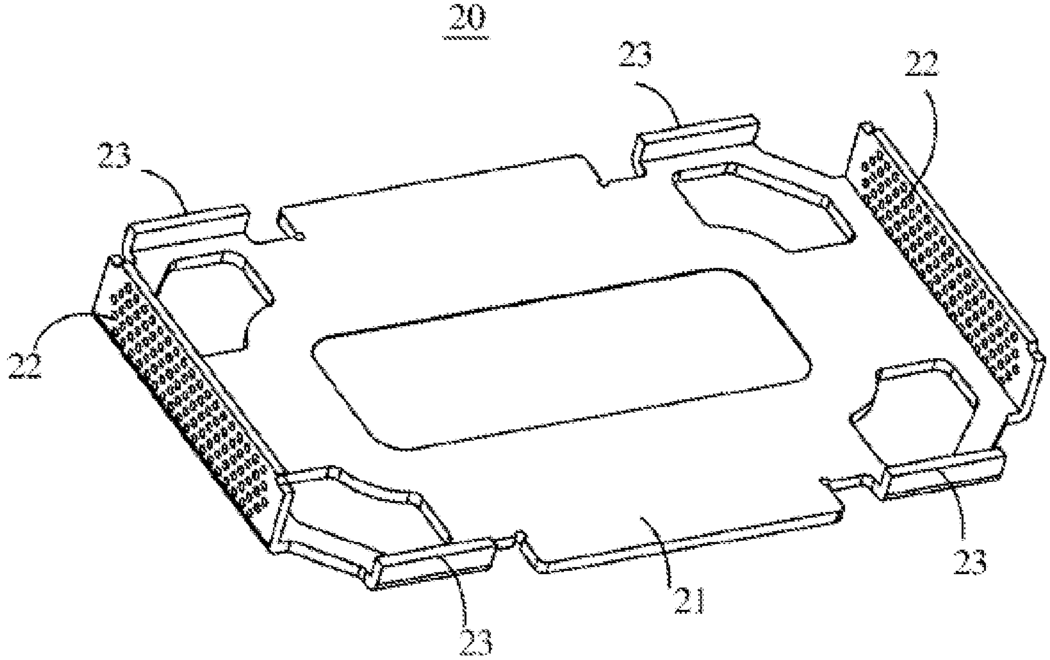
FIG. 6 is a schematic diagram of the structure of the magnetic conductive yoke in FIG. 2.

Referring to FIGS. 4 and 6, in the embodiments of the present invention, the magnetic conductive yoke 20 comprises a magnetic conductive body 21 and a connecting flange 22, the connecting flange 22 is formed by bending the outer edge of the magnetic conductive body 21 towards the side where the housing 10 is positioned, and the connecting flange 22 is provided with a plurality of ventilation holes 221. The housing 10 is connected to the magnetic conductive yoke 20, a leakage opening is formed between the housing 10 and the magnetic conductive body 21, and the connecting flange 22 completely covers the leakage opening.

The magnetic conductive body 21 substantially has a plate shape facing the diaphragm 70. The connecting flange 22 is formed by integrally bending from the outer edge of the magnetic conductive body 21, the connecting flange 22 and the magnetic conductive body 21 are an integral structure. Therefore, there is no need to provide other connection structures to connect the connecting flange 22 and the magnetic conductive body 21, and the tightness between them can be ensured.

The connecting flange 22 has a mesh structure with a plurality of micropores, which are ventilation holes 221, i.e., it can allow gas to pass through and prevent water droplets from passing through. The leakage opening leaks through the micropores of the connecting flange 22, so as to maintain a pressure balance between the inner space of the sound generating device and the outside.

The leakage opening may be located at a side surface of the sound generating device, wherein the side surface refers to a surface extending along the outer edge of the diaphragm 70. The whole sound generating device should be closed except for the leakage opening portion, so as to prevent moisture from entering the sound generating device.

In the prior art, the mesh cloth is generally disposed on the leakage opening. However, since it is difficult to maintain the shape of the mesh cloth, a misalignment between the mesh cloth and the leakage opening during integral injection molding or bonding may occur.

Considering the above problems, in the present invention, the connecting flange 22 integrally bending from the magnetic conductive yoke 20. On the one aspect, there is no relative movement between the connecting flange 22 and the magnetic conductive body 21, and thus, as long as the alignment between the magnetic conductive yoke 20 and the housing 10 is accurate, it can be ensured that the connecting flange 22 accurately covers the leakage opening. On another aspect, since the connecting flange 22 is formed of magnetic conductive material, i.e., the same as that of the magnetic conductive yoke 20, and the magnetic conductive yoke 20 substantially has great strength and hardness, it can be ensured that the connecting flange 22 has a stable shape even if the thickness of the connecting flange 22 is thin, so that the connection stability between the connecting flange 22 and the housing 10 can be ensured, the misalignment between the connecting flange 22 and the leakage opening can be prevented, thereby improving the yield of the products. In addition, the connecting flange 22 has high strength while may be a portion of the housing 10, so that it can protect the vibration system, the magnetic circuit system and other structures inside the housing 10.

In the present invention, by forming micropores in the magnetic conductive yoke 20, and bending the portion formed with the micropores to form a connecting flange 22 to replace the mesh cloth used in prior art, which is bonded thereto or injection molded, to implement a full filling sound generating device, the space can be saved, and there is no need to adopt a mold for injection molding, and thus the production cost is reduced. In addition, the connecting flange 22 is used as a portion of the magnetic conductive yoke 20, and has the magnetic conductive effect itself, so that the space can be saved, the width of the magnet (the first edge magnet 51) at the short side is increased, and the acoustic performance is improved.

In one embodiment, the thickness of the connecting flange 22 is less than or equal to 0.2 mm. For example, the thickness of the connecting flange 22 may be provided as 0.2 mm, 0.115 mm, 0.1 mm, etc. The connecting flange 22 with a size in the above range has a small thickness, and can greatly reduce the whole space occupied by the device.

Referring to FIG. 4 again, in one embodiment, the magnetic conductive body 21 comprises a first plate body 211 and a second plate body 212 which are connected to each other. The thickness of the first plate body 211 is greater than that of the second plate body 212, so that the surface of the magnetic conductive body 21 away from the housing 10 is a stepped surface, and the connecting flange 22 is connected to the second plate body 212. In this way, the thicker first plate body 211 can ensure the structural strength of the magnetic conductive yoke 20, while the thinner second plate body 212 can ensure that the connecting flange 22 is also thin, so as to prevent the size of the sound generating device from being too large in the thickness direction of the connecting flange 22.

In order to ensure the integrity and strength of the magnetic conductive body 21, a cover plate 30 may be further provided on the second plate body 212, and the shape of the cover plate 30 is substantially the same as that of the second plate body 212, so as to better fit the stepped surface between the first plate body 211 and the second plate body 212. Moreover, when the second plate body 212 is provided with an escape opening to prevent the movement of the center suspension inside the sound generating device, the cover plate 30 may seal and cover the escape opening.

Referring to FIGS. 1 and 5 again, in one embodiment, the housing 10 is formed with a plurality of first stop walls 12. The first stop walls 12 extend towards the magnetic conductive body 21 and abut on the magnetic conductive body 21. The interval between the two adjacent first stop walls 12 forms the leakage opening. The first stop walls 12 can ensure that the magnetic conductive body 21 and the housing 10 are spaced to form a leakage opening, and the first stop walls 12 can also ensure that the alignment between the magnetic conductive yoke 20 and the housing 10 is accurate. In addition, the leakage opening can also be formed by the housing 10, the magnetic conductive yoke 20 and the edge magnet together, or formed by stop walls extending from the magnetic conductive body 21 and abutting on the housing 10.

In one embodiment, the connecting flange 22 is clamped by two adjacent first stop walls 12, i.e., both sides of the connecting flange 22 abut on the corresponding first stop walls 12 and closely contact with them. The first stop walls 12 limit the movement of the connecting flange 22 along the circumferential direction of the housing 10, thereby ensuring the mounting stability of the magnetic conductive yoke 20. In addition, the connecting flange 22 is clamped by the two first stop walls 12 but not disposed on the outer side of the first stop walls 12, so that the connecting flange 22 may be accommodated in the space between the two first stop walls 12 to prevent the connecting flange 22 from exceeding the outer side surfaces of the first stop walls 12. In this way, the whole size of the magnetic conductive yoke 20 of the device in the thickness direction of the connecting flange 22 is reduced, and it can be ensured that the sound generating device has a small size in the thickness direction of the connecting flange 22.

In one embodiment, a locating flange 23 is further formed by bending the magnetic conductive body 21 towards the diaphragm 70 to form, and the housing 10 is formed with a locating notch into which the locating flange is inserted. In this embodiment, the locating flange 23 and the connecting flange 22 are spaced along the circumferential direction of the magnetic conductive body 21. The locating flange 23 is provided for alignment, and its protruding height relative to the magnetic conductive body 21 may be small. Therefore, the housing 10 which is disposed corresponding to the locating flange 23 has a relatively high height and a high strength in the vibration direction.

The housing 10 is further formed with a plurality of second stop walls 13. The second stop walls 13 extend towards the magnetic conductive body 21 and abut on the magnetic conductive body 21, wherein the locating notch is formed between the first stop wall 12 and the second stop wall 13 adjacent to each other. The configuration in which the locating notch and the leakage opening share one first stop wall 12 can reduce the number of the stop walls of the housing 10, which facilitate simplification of the structure.

In addition, a locating notch may be formed between two adjacent second stop walls 13, or a groove into which the locating flange 23 inserted may be directly formed at the housing 10.

In one embodiment, the surface of the connecting flange 22 away from the magnetic conductive body 21 abuts on the housing 10. On the one hand, the housing 10 limits the movement of the connecting flange 22 towards the diaphragm 70 to function as a stopper. On the other hand, the size of the portion of the connecting flange 22 beyond the outer side surface of the housing 10 can be reduced. Optionally, the outer side surface of the connecting flange 22 is flush with the outer side surface of the housing 10, so that the increase of the size of the whole sound generating device in the thickness direction of the connecting flange 22 due to the connecting flange 22 can be avoid.

In order to enhance the displacement limitation, in one embodiment, a surface of the housing 10 facing the magnetic conductive body 21 is provided with a slot 14, and the connecting flange 22 is inserted into the slot 14. In this embodiment, the connecting flange 22 is inserted into the slot 14 and closely contact with it, and the slot 14 may accommodate more adhesive to ensure the tightness of connection between the connecting flange 22 and the housing 10. Specifically, the housing 10 comprises a ring body 15, the first stop walls 12 are provided at the ring body 15, and the surface of the ring body 15 facing the magnetic conductive body 21 is provided with the slot 14.

In addition, the slot 14 may further penetrate through the outer side surface of the housing 10 to form a notch-like structure. In this embodiment, the outer side surface of the housing 10 refers to the surface away from the central magnet 41. After the slot 14 is formed with a notch, it only has the first slot wall close to the inner side surface of the housing 10, and the second slot wall facing the magnetic conductive body 21. The formed slot 14 into which the connecting flange 22 inserted may have a large width while remain the thickness of the wall of the housing 10 small, so as to ensure the small size of the whole sound generating device.

The case that the edge magnet corresponding to the connecting flange 22 is the first edge magnet 51, and the edge magnetic conductive plate corresponding to the connecting flange 22 is the first edge magnetic conductive plate 61 will be described as an example below.

Referring to FIG. 4 again, in one embodiment, the magnetic circuit system further comprises a first edge magnet 51, which is correspondingly provided at the side where the connecting flange 22 is located, and there is a first ventilation gap 91 between the first edge magnet 51 and the connecting flange 22. Specifically, the magnetic circuit system comprises a plurality of edge magnets, the edge magnet corresponding to the connecting flange 22 is the first edge magnet 51, and other edge magnets are second edge magnets 52. For example, take the sound generating device has a rectangular shape as an example, two first edge magnets 51 and two second edge magnets 52 are provided, and each of the first edge magnets 51 and the second edge magnets 52 extends along the circumferential direction of the magnetic conductive body 21 and has a long strip shape.

The first ventilation gap 91 between the first edge magnet 51 and the connecting flange 22 can prevent the first edge magnet 51 from covering the ventilation holes 221, so that the interior of the sound generating device can be in communication with the outside through the first ventilation gap 91 and the ventilation holes 221, thereby ensuring smooth airflow.

In one embodiment, the length of the first edge magnet 51 is less than that of the connecting flange 22. The length in this embodiment refers to the length extending along the circumferential direction of the magnetic conductive body 21. The length of the first edge magnet 51 is small, so that the shielding area of the connecting flange 22 is also small, and thus the gas flow between the interior of the sound generating device and the outside is smoother.

In one embodiment, the magnetic circuit system further comprises a first edge magnetic conductive plate 61, which is correspondingly provided at the side where the connecting flange 22 is located, and there is a second ventilation gap 92 between the first edge magnetic conductive plate 61 and the connecting flange 22. Specifically, the magnetic circuit system comprises a plurality of edge magnetic conductive plates, the edge magnetic conductive plate 61 corresponding to the connecting flange 22 is the first edge magnetic conductive plate 61, and other edge magnetic conductive plates are second edge magnetic conductive plates 62. For example, take the sound generating device has a rectangular shape as an example, two first edge magnetic conductive plates 61 and two second edge magnetic conductive plates 62 are provided, and each of the first edge magnetic conductive plates 61 and the second edge magnetic conductive plates 62 extends along the circumferential direction of the magnetic conductive body 21 and has a long strip shape.

The second ventilation gap 92 between the first edge magnetic conductive plate 61 and the connecting flange 22 can prevent the first edge magnetic conductive plate 61 from covering the ventilation holes 221, so that the interior of the sound generating device can be in communication with the outside through the second ventilation gap 92 and the ventilation holes 221, thereby ensuring smooth airflow.

In one embodiment, the length of the first edge magnetic conductive plate 61 is less than that of the connecting flange 22. The length in this embodiment refers to the length extending along the circumferential direction of the magnetic conductive body 21. The length of the first edge magnetic conductive plate 61 is small, so that the shielding area of the connecting flange 22 is also small, and thus the gas flow between the interior of the sound generating device and the outside is smoother.

In this embodiment, the first edge magnetic conductive plate 61 and the first edge magnet 51 are disposed to be stacked in the vibration direction, and may have the same width, so that the inner side surfaces and the outer side surfaces of them are flush with each other. The first ventilation gap 91 and the second ventilation gap 92 correspond to each other in the vibration direction, and form an overall ventilation gap together.

In addition, the ring body 15 of the housing 10 may be provided with a mounting wall 16 extending inwardly and facing the magnetic conductive body 21, and the surface of the edge magnetic conductive plate away from the magnetic conductive body 21 abuts on the mounting wall 16.

It should be noted that the housing 10 in the present invention may be formed by one part, or the housing 10 is composed of a plurality of parts, for example, the housing 10 comprises a plastic part and the above edge magnetic conductive plate which are connected to each other, and the edge magnetic conductive plate may be integrally molded with the plastic part by injection molding. Here, the plastic part itself may have a closed annular structure, and the edge magnetic conductive plate is located at the inner side surface of the plastic part. Alternatively, the plastic part and the edge magnetic conductive plate are enclosed together to form a closed annular structure. In addition, the housing 10 may comprise a plastic part, a metal part, and an edge magnetic conductive plate. Of course, the housing 10 may also be a metal housing 10, a portion of which forms an edge magnetic conductive plate.

In one embodiment, the sound generating device has a rectangular shape, each of two short sides of the sound generating device is provided with one leakage opening, and each leakage opening is correspondingly provided with one connecting flange 22. The provision of two leakage openings makes the sound generating device have a larger gas exchange channel and better pressure relief effect. Moreover, the two leakage openings are provided at opposite positions, so that the ventilation effect is better.

The above embodiments are only the preferred embodiments of the present invention, and do not limit the patent scope of the present invention. Under the invention concept of the present invention, the equivalent structural transformation made by using the contents of the description and drawings of the present invention, and the direct/indirect application in other relevant technical fields all fall into the patent protection scope of the present invention.

What is claimed is:

1. A sound generating device, comprising a housing, and a vibration system and a magnetic circuit system which are coupled to the housing, wherein the magnetic circuit system comprises a magnetic conductive yoke including a magnetic conductive body and a connecting flange, the magnetic conductive body faces a diaphragm of the vibration system, the connecting flange is formed by bending the magnetic conductive body towards a side where the diaphragm is located, and the connecting flange is provided with a plurality of ventilation holes; and wherein a leakage opening is formed between the housing and the magnetic conductive body, and the connecting flange completely covers the leakage opening.

2. The sound generating device according to claim 1, wherein the housing is formed with a plurality of first stop walls extending towards the magnetic conductive body and abutting on the magnetic conductive body, and the leakage opening is formed by an interval between two adjacent first stop walls.

3. The sound generating device according to claim 2, wherein the connecting flange is clamped by the two adjacent first stop walls.

4. The sound generating device according to claim 2, wherein a locating flange is further formed by bending the magnetic conductive body towards the diaphragm, and the housing is formed with a locating notch into which the locating flange is inserted.

5. The sound generating device according to claim 4, wherein the housing is further formed with a plurality of second stop walls extending towards the magnetic conductive body and abutting on the magnetic conductive body, and wherein the locating notch is formed between the first stop wall and the second stop wall adjacent to each other.

6. The sound generating device according to claim 1, wherein a surface of the connecting flange away from the magnetic conductive body abuts on the housing.

7. The sound generating device according to claim 6, wherein a surface of the housing facing the magnetic conductive body is provided with a slot, and the connecting flange is inserted into the slot.

8. The sound generating device according to claim 7, wherein the slot further penetrates through an outer side surface of the housing.

9. The sound generating device according to claim 1, wherein the magnetic circuit system further comprises a first edge magnet which is correspondingly provided at a side where the connecting flange is located, and a first ventilation gap is formed between the first edge magnet and the connecting flange; and/or wherein the magnetic circuit system further comprises a first edge magnetic conductive plate which is correspondingly provided at the side where the connecting flange is located, and a second ventilation gap is formed between the first edge magnetic conductive plate and the connecting flange.

10. The sound generating device according to claim 9, wherein a length of the first edge magnet is less than that of the connecting flange, and a length of the first edge magnetic conductive plate is less than that of the connecting flange.

11. The sound generating device according to claim 1, wherein a thickness of the connecting flange is less than or equal to 0.2 mm.

12. The sound generating device according to claim 1, wherein the sound generating device has a rectangular shape, each of two short sides of the sound generating device is provided with one leakage opening, and each leakage opening is provided with one connecting flange correspondingly.

* * * * *